United States Patent
Martynov et al.

(10) Patent No.: US 9,904,461 B1
(45) Date of Patent: Feb. 27, 2018

(54) METHOD AND SYSTEM FOR REMOTE TEXT SELECTION USING A TOUCHSCREEN DEVICE

(71) Applicant: Parallels IP Holdings GmbH, Schaffhausen (CH)

(72) Inventors: Dmitry Martynov, Moscow (RU); Sergey Chuzhanov, Moscow (RU); Andrey A. Omelyanchuk, Moscow (RU); Yury Makarov, Moscow (RU); Nikolay Dobrovolskiy, Moscow (RU); Stanislav S. Protassov, Moscow (RU); Serguei M. Beloussov, Singapore (SG); Alexander Patsay, Moscow (RU); Artem Kolomeitzev, Moscow (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 437 days.

(21) Appl. No.: 14/840,002

(22) Filed: Aug. 30, 2015

Related U.S. Application Data

(62) Division of application No. 13/803,019, filed on Mar. 14, 2013.

(51) Int. Cl.
*G06F 3/0488* (2013.01)
*G06F 3/0484* (2013.01)

(52) U.S. Cl.
CPC ........ *G06F 3/0488* (2013.01); *G06F 3/04842* (2013.01)

(58) Field of Classification Search
CPC ..................................................... G06F 3/0488
USPC ........................................................ 715/740
See application file for complete search history.

(56) References Cited

U.S. PATENT DOCUMENTS

| | | | | |
|---|---|---|---|---|
| 8,442,311 | B1 * | 5/2013 | Hobbs | G06T 9/00 382/166 |
| 9,274,742 | B2 * | 3/2016 | Phillips | G06F 9/4445 |
| 2008/0239365 | A1 * | 10/2008 | Salgado | G06F 17/212 358/1.15 |
| 2009/0300510 | A1 * | 12/2009 | Gantman | G06F 3/0481 715/740 |
| 2011/0145823 | A1 * | 6/2011 | Rowe | G06Q 10/109 718/100 |
| 2011/0211212 | A1 * | 9/2011 | Berard | H04N 1/00204 358/1.13 |
| 2012/0089769 | A1 * | 4/2012 | Buswell | G06F 3/1454 711/103 |

(Continued)

OTHER PUBLICATIONS

Hachman, Mark, "Splashtop Releases Remote Desktop for iPhone", PC Magazine ONline: NA. Ziff Davis, Inc., published Nov. 19, 2010, 3 pages.*

*Primary Examiner* — William Bashore
*Assistant Examiner* — Daniel Rodriguez
(74) *Attorney, Agent, or Firm* — Bardmesser Law Group

(57) ABSTRACT

A method for selecting the text on a remote computer or a server from a mobile device is provided. Actions of a user for selecting a text area on the mobile device are emulated on a remote server. A user initiates text selection on a mobile device using touch screen functionality, which is reflected on selected elements of a remote server. Once the mobile device user completes the selection, the emulator selects a corresponding area of the server screen. All mobile device user actions related to selection of text area are emulated on a remote server.

10 Claims, 23 Drawing Sheets

(56) References Cited

U.S. PATENT DOCUMENTS

| | | | |
|---|---|---|---|
| 2012/0124495 A1* | 5/2012 | Amichai | G06F 8/34 715/762 |
| 2012/0229397 A1* | 9/2012 | Cho | G06F 3/0488 345/173 |
| 2012/0297314 A1* | 11/2012 | Stein | G06Q 10/10 715/751 |
| 2013/0024777 A1* | 1/2013 | Brakensiek | G06F 3/048 715/740 |
| 2013/0191108 A1* | 7/2013 | Anisimovich | G06F 17/289 704/4 |
| 2013/0215018 A1* | 8/2013 | Xu | G06F 3/0488 345/157 |
| 2013/0218567 A1* | 8/2013 | Jones | G10L 13/00 704/260 |
| 2013/0246932 A1* | 9/2013 | Zaveri | G06F 3/017 715/740 |
| 2013/0290857 A1* | 10/2013 | Beveridge | G06F 3/0484 715/740 |
| 2014/0013234 A1* | 1/2014 | Beveridge | G06F 3/0484 715/740 |
| 2014/0181682 A1* | 6/2014 | Spracklen | G06F 3/1454 715/740 |
| 2014/0344766 A1* | 11/2014 | Cao | G06F 3/017 715/863 |

* cited by examiner

A. Paragraph mode
Pull for active points.
Paragraphs that are all in area by vertical are selected.

B. Sentence mode
Pull for active points.
Sentences, that are all in area by vertical && (start of sentence more to the right of left active point) && (end of sentence more to the left of right active point) are selected.

C. Word mode
Click on the word.
This word is selected (without spaces).

D. Symbol mode {with magnifier}
Pull for active points.
Text that is entirely in area by vertical && (first symbol more to the right of left active point) && (last symbol more to the left of right active point) is selected.

F. Cell mode
Pull for active points.
Cells, that (are in area) || (touched by edges of area) are selected.

E. Table mode
Click on the top-left angle of table.
All table are be selected.

METHOD AND SYSTEM FOR REMOTE TEXT SELECTION USING A TOUCHSCREEN DEVICE

CROSS REFERENCE TO RELATED APPLICATIONS

This application is a divisional of U.S. patent application Ser. No. 13/803,019, filed on Mar. 14, 2013, incorporated herein by reference.

BACKGROUND OF THE INVENTION

Field of the Invention

The present invention relates to remote text processing, and more particularly, to a method and system for working with the text or similar structures such as icons or widgets on a computer screen or virtual desktop accessible remotely by a mobile device.

Description of the Related Art

The industry trend of using mobile devices and various tablets presents some challenges with regard to remote access to text on desktop/laptop computers. Text selection is one of the most frequent and important operation used when working with text. However, selection of the text on a PC or a laptop using a standard Operating System (OS) is performed differently than how the same operation is performed on various mobile devices (such as tablets), where all operations are performed by touch screen options using fingers.

Thus, if a user wants to work with the text on a regular computer remotely from his mobile device, he cannot use a text-select feature. The main challenge is presented by different approaches for text selection techniques in desktop OSs and mobile OSs.

Accordingly, an easy to use and an intuitive way for selecting a text from a mobile device and working with the selected text remotely is desired.

SUMMARY OF THE INVENTION

The present invention is related to a method and system for working with the text on the computer screen accessible remotely by a mobile device.

In one aspect, a method for selecting the text on a remote computer or a server is provided. Actions of a user for selecting a text area are emulated on a remote server. A user initiates text selection on a mobile device using touch screen functionality which is reflected on selected elements of a remote server. Once the mobile device user completes the selection, the emulator selects a corresponding area of the server screen. All mobile device user actions related to selection of text area are emulated on a remote server.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
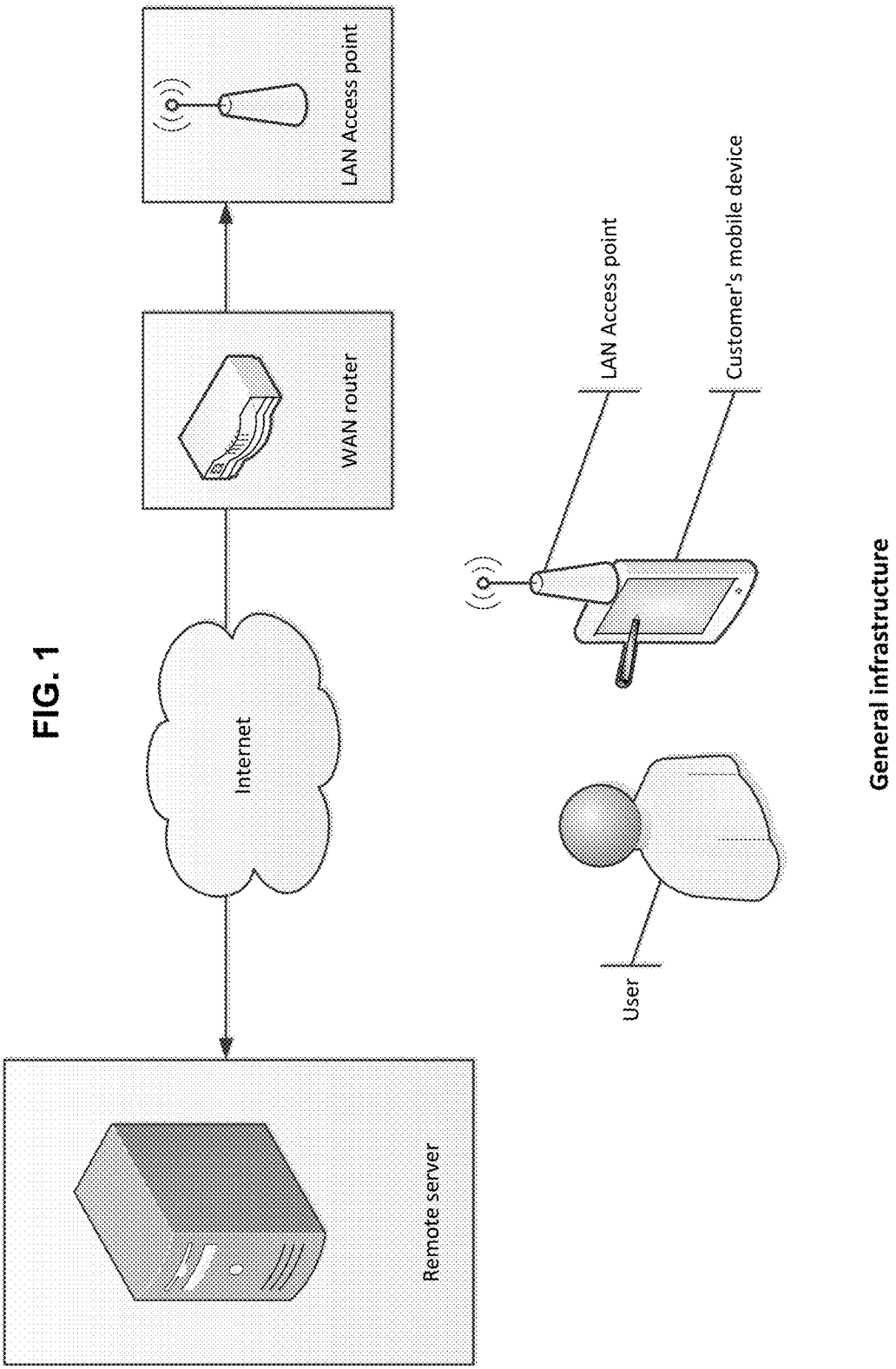
FIG. 1 illustrates a general infrastructure, in accordance to the exemplary embodiment.

Reference will now be made in detail to the embodiments of the present invention, examples of which are illustrated in the accompanying drawings.

The present invention is related to a method and system for working with the text on the computer screen or virtual desktop accessible remotely by a mobile device. In one aspect, a method for selecting the text on a remote computer or a server is provided. Actions of a user for selecting a text area are emulated on a remote server.

A user initiates text selection on a mobile device using touch screen functionality, which is reflected on selected elements maintained by a remote server. Once the mobile device user completes the selection, the emulator selects a corresponding area of the server screen (real or virtual). All mobile device user actions related to selection of text area are emulated on a remote server.

According to the exemplary embodiment, the method deals with the two types of users, who have different text selection needs and goals. One type of users tries to use iOS text selection rules implemented in typical iOS applications. Another type of users, are the desktop users who want to use Mac/Windows text selection rules via touch screen interface. According to the exemplary embodiment, three possible text selection scenarios are addressed:

iOS text selection simulation;

desktop text selection adoption for touch user interface; and a combination of both scenarios.

The iOS like text selection scenario is implemented as follows. Text detection and/or text recognition engine may be embedded into the operating system of the tablet device. When a common selection tool, e.g., rectangular area selection or circle area selection is started on the screen containing a video of the remote desktop, the system recognizes that text selection is required and starts the text selection tool instead.

As an optional embodiment, the area selected by user on the tablet overlaps the video and may be more or less viewable. Since the user himself can recognize the area required for selection, the selection on the screen of the tablet corresponds to the area on the remote desktop required for selection. The selection is performed in the host, and is maintained in the host-side buffer, and the client only maintains the frame around the area. If no text is recognized by the host and placed in the buffer, then the frame is maintained using the points defining the frame, in response to user gestures/swipes/touch commands. The menu associated with the frame is based on a standard client-side overlay menu (e.g., copy, paste, etc.). In another embodiment of the invention the user enters a text selection mode using a selection tool. The text selection may be performed by using a long tap or by other gestures. The long tap also (depending on the settings) invokes a magnification glass, such as, for example, described in U.S. Provisional Patent Application No. 61/652,209, filed Jun. 10, 2012, incorporated herein by reference. In order to use the magnification glass instead of activating text selection, the user can move a finger to any direction before removing it from the screen.

Figure 18:
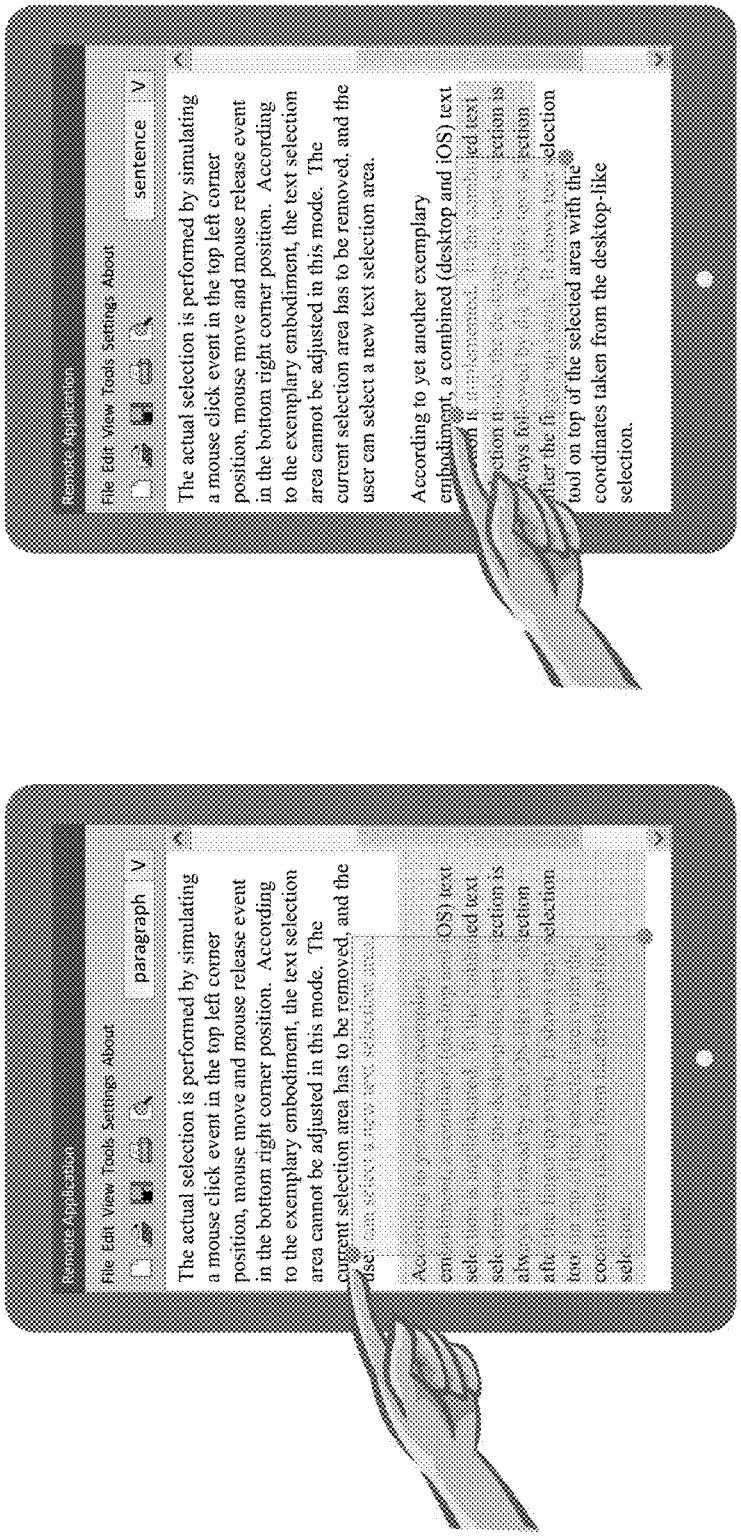
FIGS. 18-22 show selection of various text-related objects on the tablet.
Figure 19:
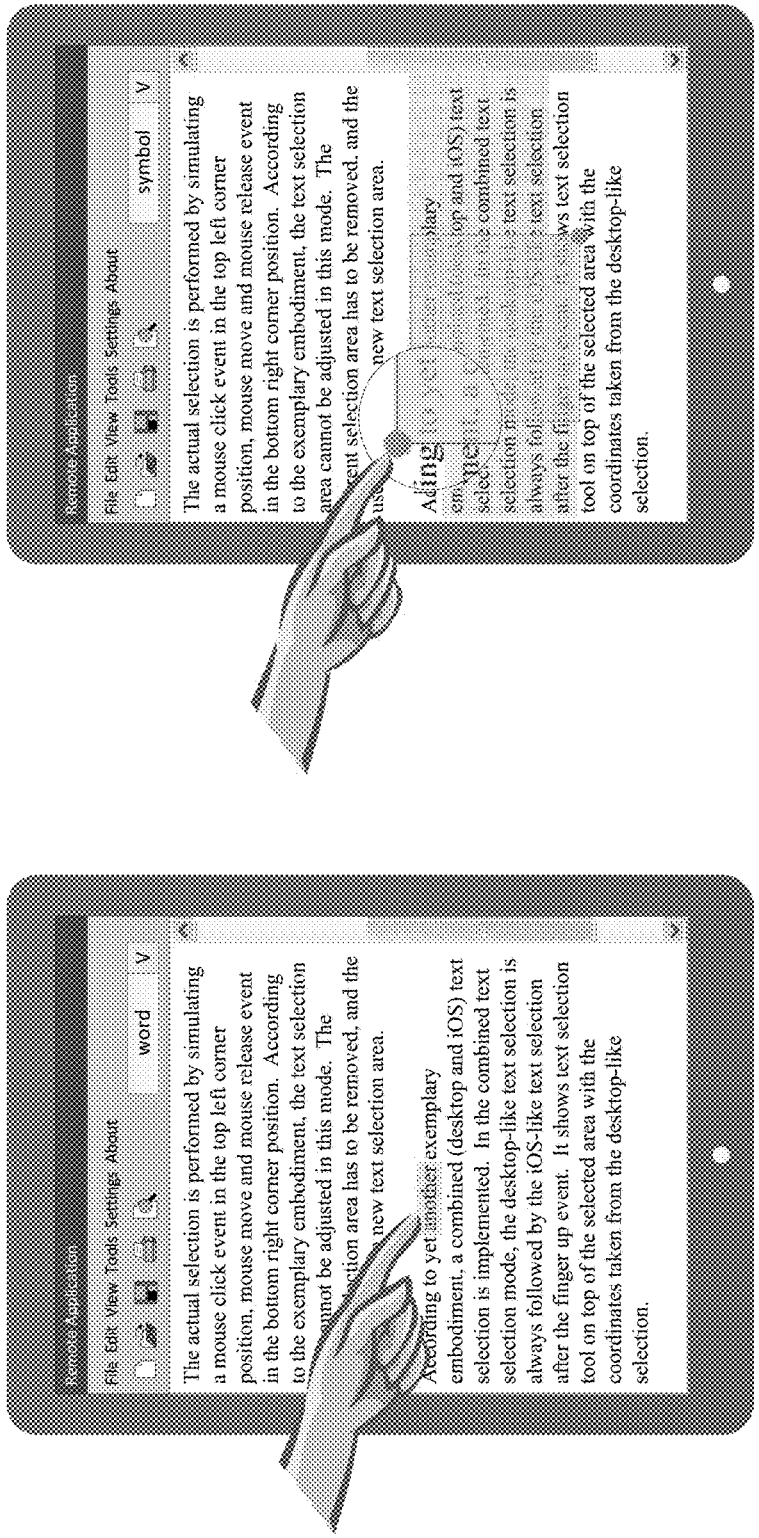
Figure 20:
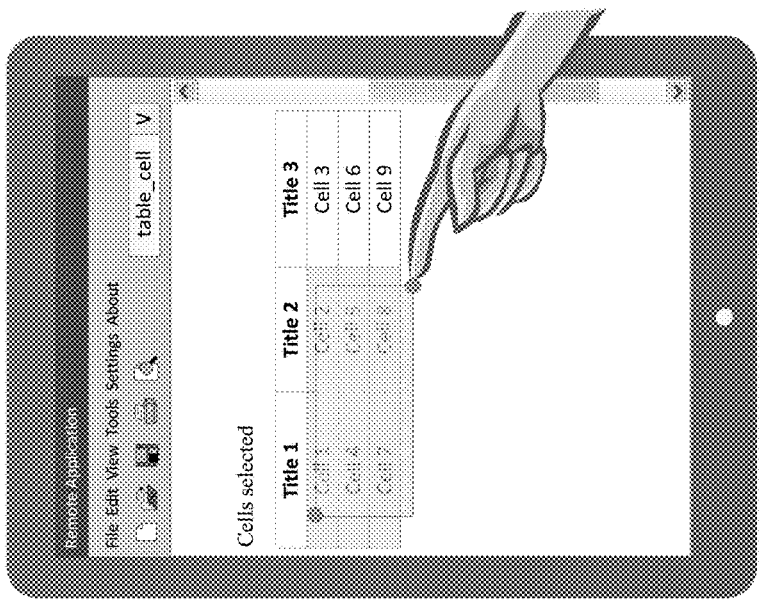
Figure 20:
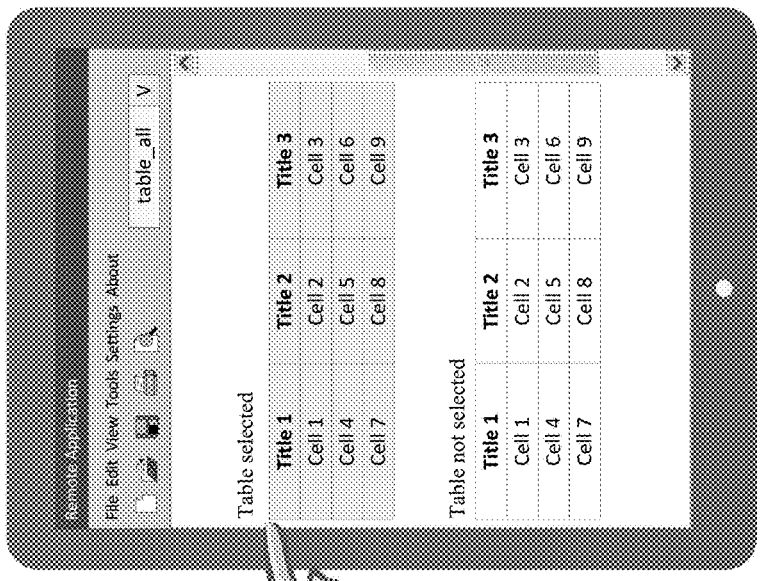
Figure 21:
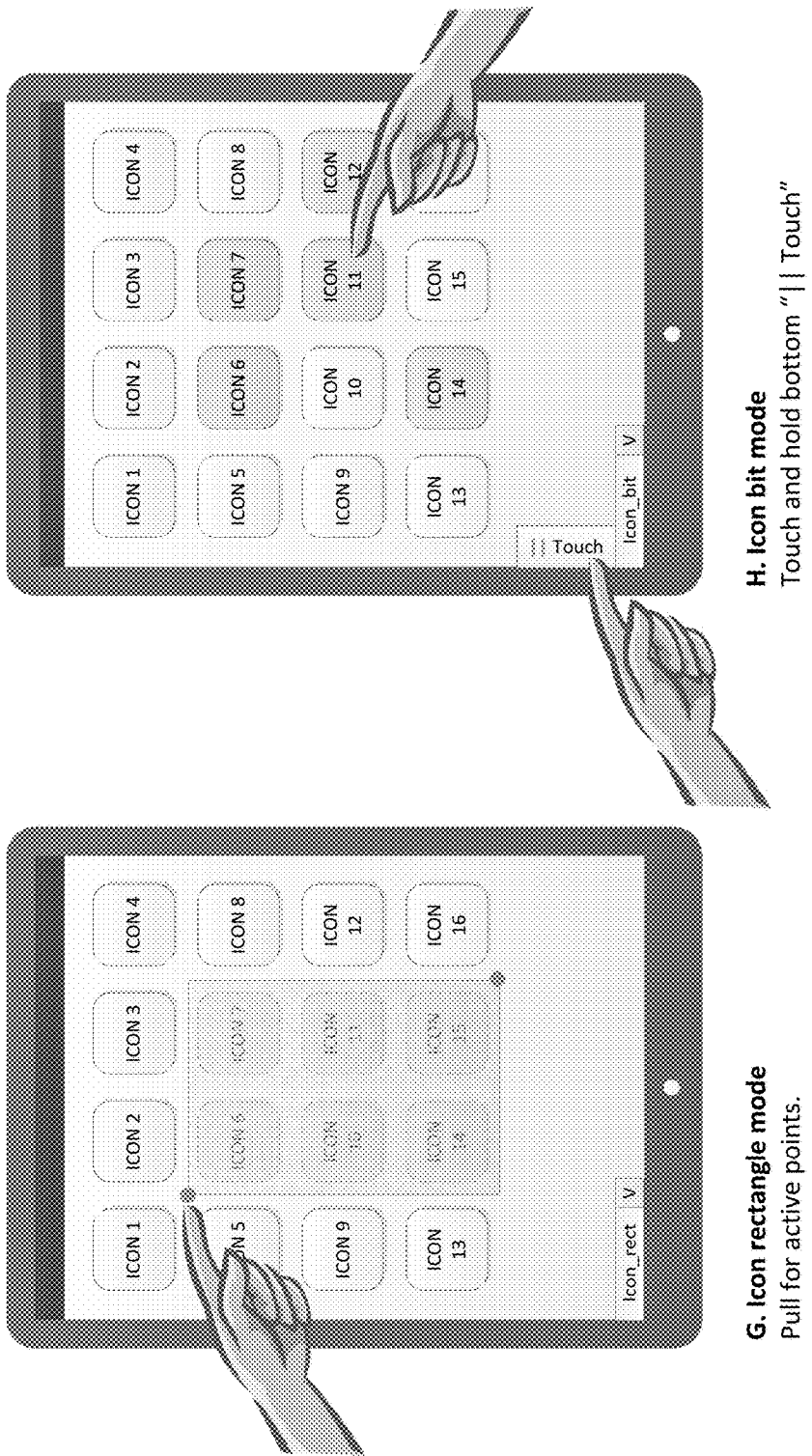
Figure 22:
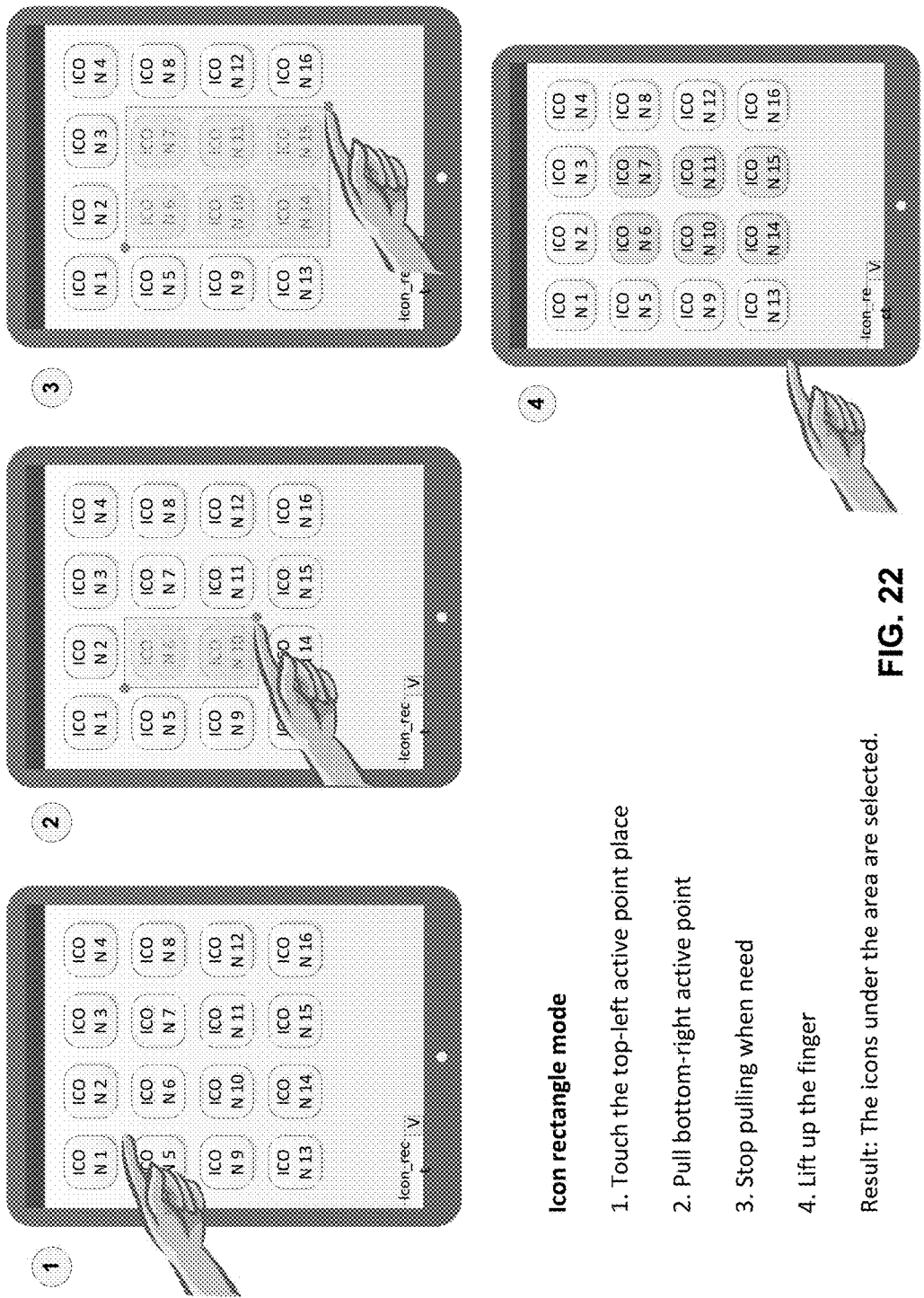

Another option is applying a double tap. The double tap over the word or icon may activate selection of word or phrase or abstract lying under a tap. The problem is that text or icon recognizing tool is required for initial selection since the tablet works with images of video. Also, an on-screen (virtual) keyboard may be used for initial selection, for example, by using a common key combination, or by moving finger over sleeted area while pressing the Shift virtual button. In most cases, the selected area is shown to the user e.g., in a form of a blue frame of a default or specific size, keeping in mind that words or phrases or even letters may have different sizes in different contexts. Note that a current font size may be used by text selection tool to recognize text areas or for generation of selection area, for example, based on text recognition techniques described below. If there is text selection activated, then the frame is drawn around the text, otherwise, the gesture or double click is treated the way the tablet device normally treats such events, rather than to identify text. The text selection is optionally continuously tracked on the host side (e.g., whether the user has selected a few symbols, see FIG. 19, illustration D, a word, see FIG. 19, illustration C, several words, a sentence, see FIG. 18, illustration A, a paragraph, see FIG. 18, illustration A, a table, see FIG. 20, illustration E, individual cells, see FIG. 20, illustration F, a group of icons within an area, see FIG. 21, illustration G, selected icons, see FIG. 21, illustration H, see also FIG. 22 showing a sequence of events for selecting icons, and so on).

On the client-side or on the host side (preferably the latter), there can be a procedure that identifies elements of the workspace or screen, that include icons, letters, or icons with letters. Therefore, the selected area is not arbitrary, but follows the contour of the icon/text elements within it. It is unnecessary to identify these elements or letters with specificity, but rather, identifying their presence and general size and shape is sufficient, such as identifying the presence and approximate shape of tables, cell borders, numbers, bullet points, cursive letters, blank spaces, specific graphical elements, such as icons, icons with letters, etc.

As one option, the text identification is performed based on an intermediate format, such as frames in a frame buffer of a video card, or from screen images at various points in time. The result of the identification is a rectangle, or a set of rectangles, or a set of polygons, or a frame that circumscribe the text, and which are sent from the host to the mobile device separately, to synchronize the display on the mobile device.

On the host side, the text recognition/detection involves the following:

1. Client requests current selection with a region of interest.
2. Host gets the latest screen image and do the following steps:
3. Image is converted to binary form. All pixels of output image are set to 1 if the distance to the OS default selection color in the HSV color space is below a threshold.
4. The binary image is cleaned up, to remove isolated groups of one or two 1s surrounded by 0s. All isolated groups that do not intersect with the region of interest are removed.
5. The horizontal gaps in the image are filled in. Fill all 0s have is on the left and on the right near it.
6. The vertical gaps in the image are filled in. Fill all 0s have 1s on the top and on the bottom near it.
7. A ready selection image is converted to a list of rectangles that exactly fits the selection.
8. Host responds with the list of rectangles found.

As further options, the system can check for draggable elements near the position identified by the user gesture and/or near the frame defining the identified text. This can be particularly useful for identification of icons and similar graphical elements. The task can be a difficult one, and as a first step, the direct analysis of the graphical interface is used, then, user behavior analysis, and then, identification of the text as described above.

Video can also be analyzed, to instruct the encoder (which should normally be done in real time and aids the encoder to correctly encode areas with text, video and rapid animation). Frame rate can also be analyzed, to ensure consistency and reduce delays.

According to the exemplary embodiment, the selection tool initially makes remote text selection by simulating a mouse click action in the top left corner position and a shift+mouse click action in bottom right corner position. According to the exemplary embodiment, a text selection is adjusted. The text selection buffer is maintained on the server with the remote desktop. The tablet works with images and "fake" text selection. In a common case, the buffer content is used also on the remote desktop/server and is not transmitted to tablet. The text is adjusted by:

Resizing the selection by moving one of the hot corners, visually marked by dots (top left corner and bottom right corner);

Moving the selection by dragging a whole selection frame (tap and drag on any place inside frame);

Resizing the selection by pinch zoom in/out, when two fingers are moving from each other the selection is magnified, and vice versa. In this case, the selection area may be changed only with the underneath layer being stable or both text image and selection area may be zoomed simultaneously. The feature is useful for large fragments selection or for precise selection. When magnifying picture the center point between fingers may stay on the screen and moving both fingers may produce moving of the picture, so that the user can browse the text in this manner.

According to the exemplary embodiment, the selection tool change remote text selection on finger up event by simulating a mouse click event in top left corner position and shift+mouse click in bottom right corner position. According to the exemplary embodiment, the user needs to exit text selection mode (i.e., use a hide selection tool). The user can exit the text selection mode by:

Using a tap outside the selection frame;

Switching to a different remote application/window.

Note that in both cases the client hides the selection tool, but does not change the remote text selection. In order to remove a text selection tool (a frame) the user can tap outside the text selection area. According to the exemplary embodiment, the selection tool is implemented as a (for example) blue rectangular frame with active corners (top left and bottom right) marked by the blue dots.

Alternatively, iOS-like blue pins in active corners are used. According to the exemplary embodiment, a runtime option on a client can provide for switching between the above appearances implementations, the default one being a blue frame. Note that if one of the active corners is placed on active UI element (such as a link), the user can slightly move/resize the selection tool.

According to another exemplary embodiment, a desktop-like text selection is implemented. In order to start the text selection, a user can tap screen for 0.2-1 seconds (i.e., it should be longer then a click like tap) in top left corner of a desired selection area while indication of selection tool stared or without notification, move a finger across the selection area to the bottom right corner, and remove the finger from the touch screen. The notification may appears in any convenient form, for example, in a form of textual notification on the visible part of the screen or in form of blinking screen, changing screen color and so on. Also, the time for successful tap may be adjusted in settings of the tablet.

The actual selection is performed by simulating a mouse click event in the top left corner position, mouse move and mouse release event in the bottom right corner position. According to the exemplary embodiment, the text selection area cannot be adjusted in this mode. The current selection area has to be removed, and the user can select a new text selection area. The text selection area is removed by a user tap performed outside of the text selection area.

According to yet another exemplary embodiment, a combined (desktop and iOS) text selection is implemented. In the combined text selection mode, the desktop-like text selection is always followed by the iOS-like text selection after the finger up event. It shows text selection tool on top of the selected area with the coordinates taken from the desktop-like selection.

FIG. 1 illustrates a general infrastructure in accordance to the exemplary embodiment. A user of a mobile device accesses a remote server over the Internet and selects the text on the server using the touch screen functionality of the mobile device through emulation implemented on the server.

Figure 2A:
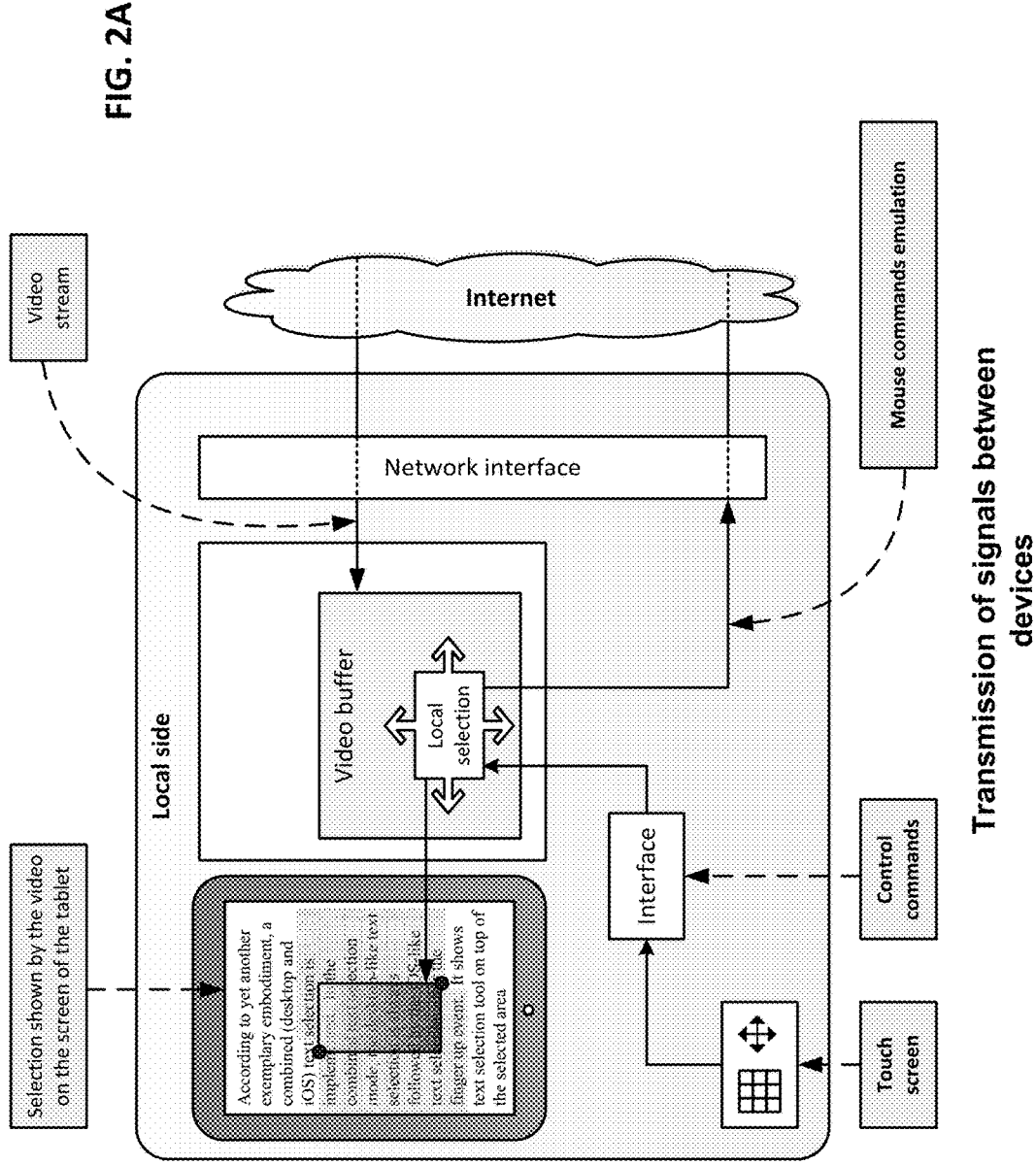
FIGS. 2A, 2B illustrate detailed system architecture.
Figure 2B:
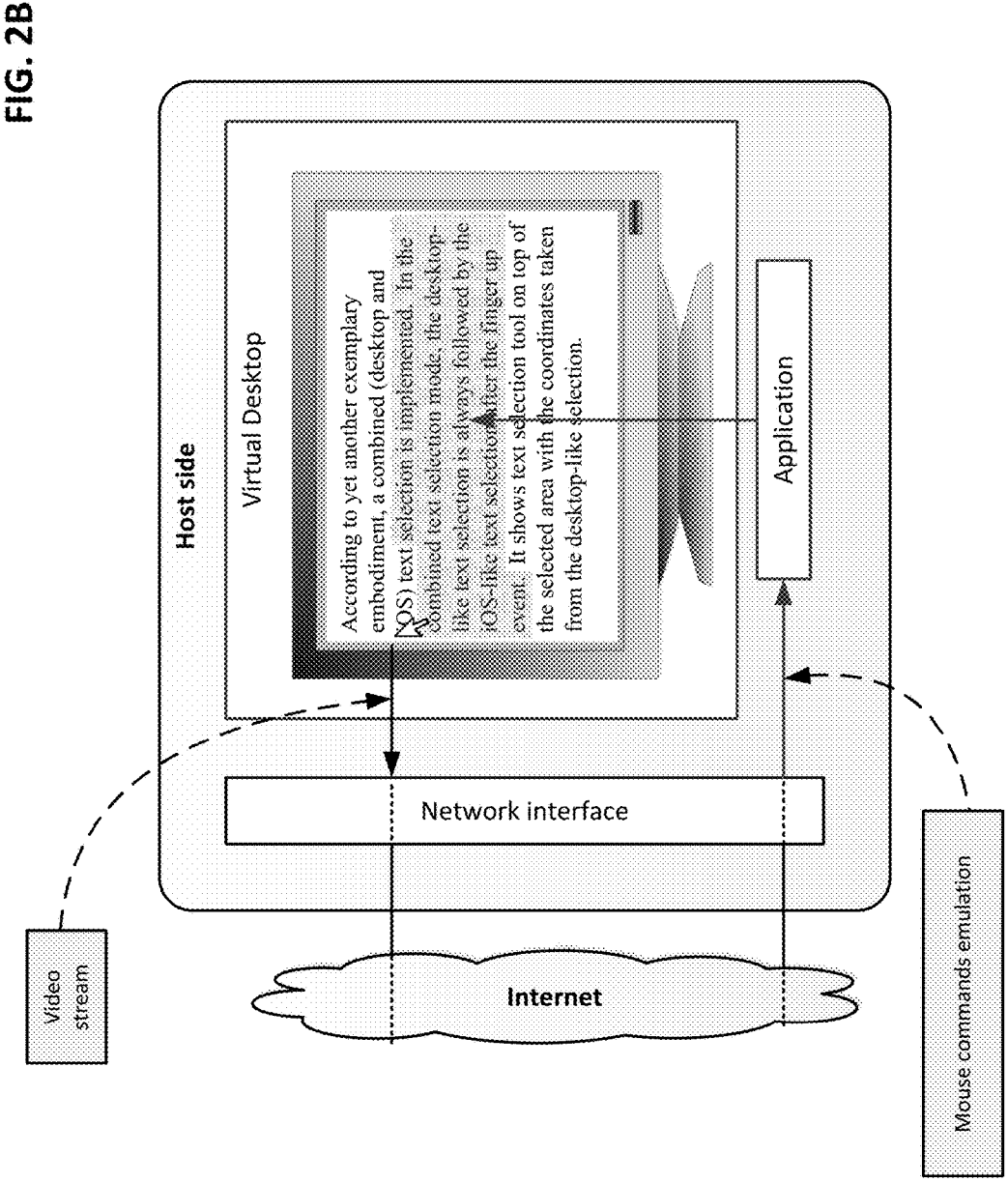

FIGS. 2A, 2B illustrate detailed system architecture. As an example, FIG. 2A shows a touchscreen, located above a display window (shown separately). The touchscreen, through a hardware and/or software interface, transmits information about physical contacts with it (touch, swipe, etc.) to an operating system (not shown). Also, the touchscreen device receives an encoded video signal through a network, which represents the image of a desktop of the remote server. Additionally, the touchscreen device and the system for text selection take part in forming the image in the video buffer, with the touchscreen device forming commands from the user, which are transformed and interpreted, in order to define the selected area on the screen. In one embodiment, the text already selected on the server is overlapped with text selected on the tablet/touchscreen device (which happens as a dynamic process). Once the selected area is transformed, the commands are formed to define the selected text for the server. These can be, for example, mouse clicks or virtual keyboard hotkeys or shortcuts. As an option, the system can increase or decrease the selected area on the server, to match the selected area(s) on the tablet. For example, the system can increase or decrease the area by one letter, word, paragraph or sentence. Hotkey combinations can also be used, such as described in published literature for desktop-type (i.e., non-iOS) applications, e.g., for MICROSOFT WORD (shift+arrow left or right, control+shift+arrow, copy/paste hotkey combinations, etc.), where touchscreen gestures/events are translated into mouse events on the host side. Once the image is sent from the server to the tablet, including the selections that occurred on the server, the selected area being used on the tablet can be made more transparent, while the anchor points that can be used to drag the borders of the selected area may be fine visible.

FIG. 2B shows a schematic of the server, which includes a network interface and a user application that generates the text and a memory region used to form the image of the desktop. This can be a frame buffer or a video card emulator or a system for capturing data used to form the desktop image. The frame buffer is encoded using a code, and the video is transmitted to the tablet. The tablet sends commands that emulate mouse actions and virtual keyboard actions.

Figure 3:
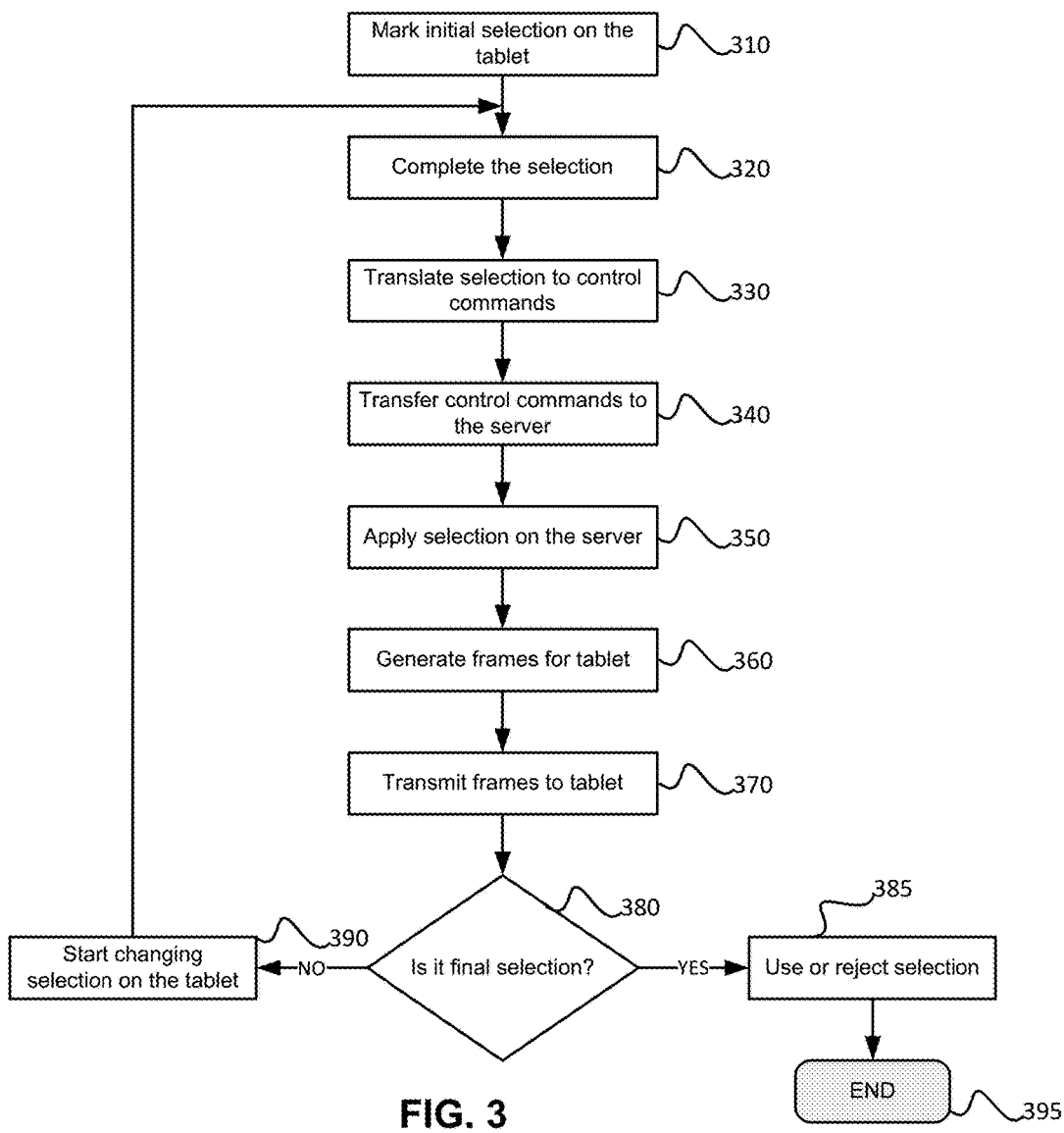
FIG. 3 illustrates a flow chart of a method, in accordance with the exemplary embodiment.

FIG. 3 illustrates a flow chart of the method in accordance to the exemplary embodiment. A mobile device is connected to a server. In step 310, an initial selection of a text on a mobile device is marked. The initial selection is completed in step 320. The initial selection is translated into server control commands in step 330. The process transfers the control commands to the server in step 340. The selection is applied on the server in step 350. The server generates the frames for the mobile device in step 360. The frames are transmitted to the mobile device (i.e., a tablet) in step 370. If the selection is final (step 380) the selection is used or rejected As one example, the user can select a buffer operation menu on the touchscreen device (e.g., copy, paste, move), which can be located in a corner or edge of the screen, or invoked with a short tap. Then the selection is considered final and consequent selection description and the operation (e.g., copy to clipboard) description are subsequently transmitted to the server. In another option, the user can have a time for pre-final modification of selection. For example, if the selection on the mobile device stays untouched for more then a predefined period, e.g., 1-5 seconds, then it is considered final and the selection is visually duplicated in the server frame buffers, and rendered, correspondingly on the mobile or touchscreen devices. The user in this case can modify the local selection repeatedly without transmitting data to the server if subsequent modifications are repeated within the corresponding time interval (1-5 seconds as shown above.) The menu which is used for definition selection commands is generated and displayed on the touchscreen device, but may correspond to the host native commands for selections or clipboards control commands. And the process ends in step 395. Otherwise, the user changes the selection in step 390 and the process moves back to the step 320.

Figure 5:
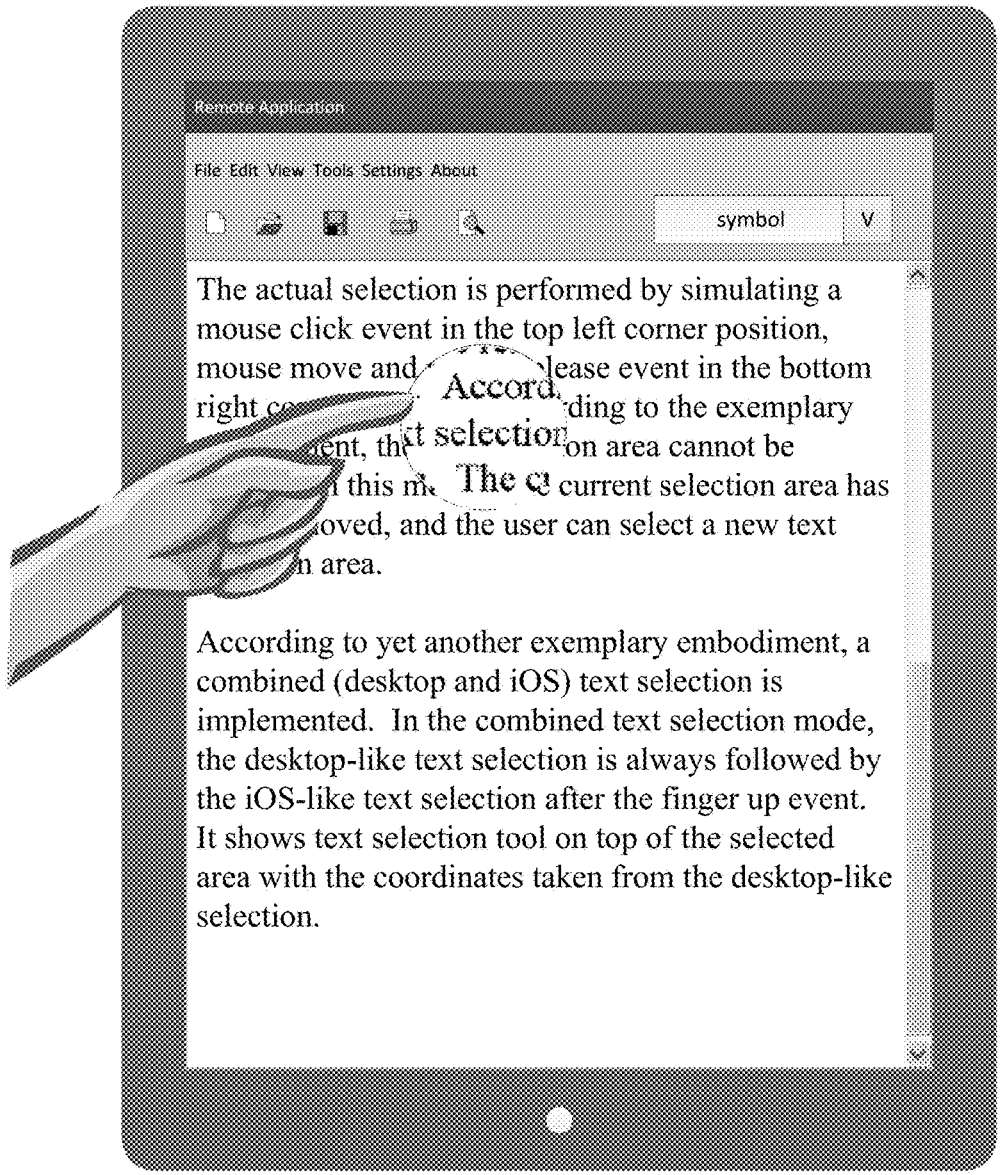
FIGS. 5-17 show screenshot-type assemblies illustrating the method as described herein.
Figure 6:
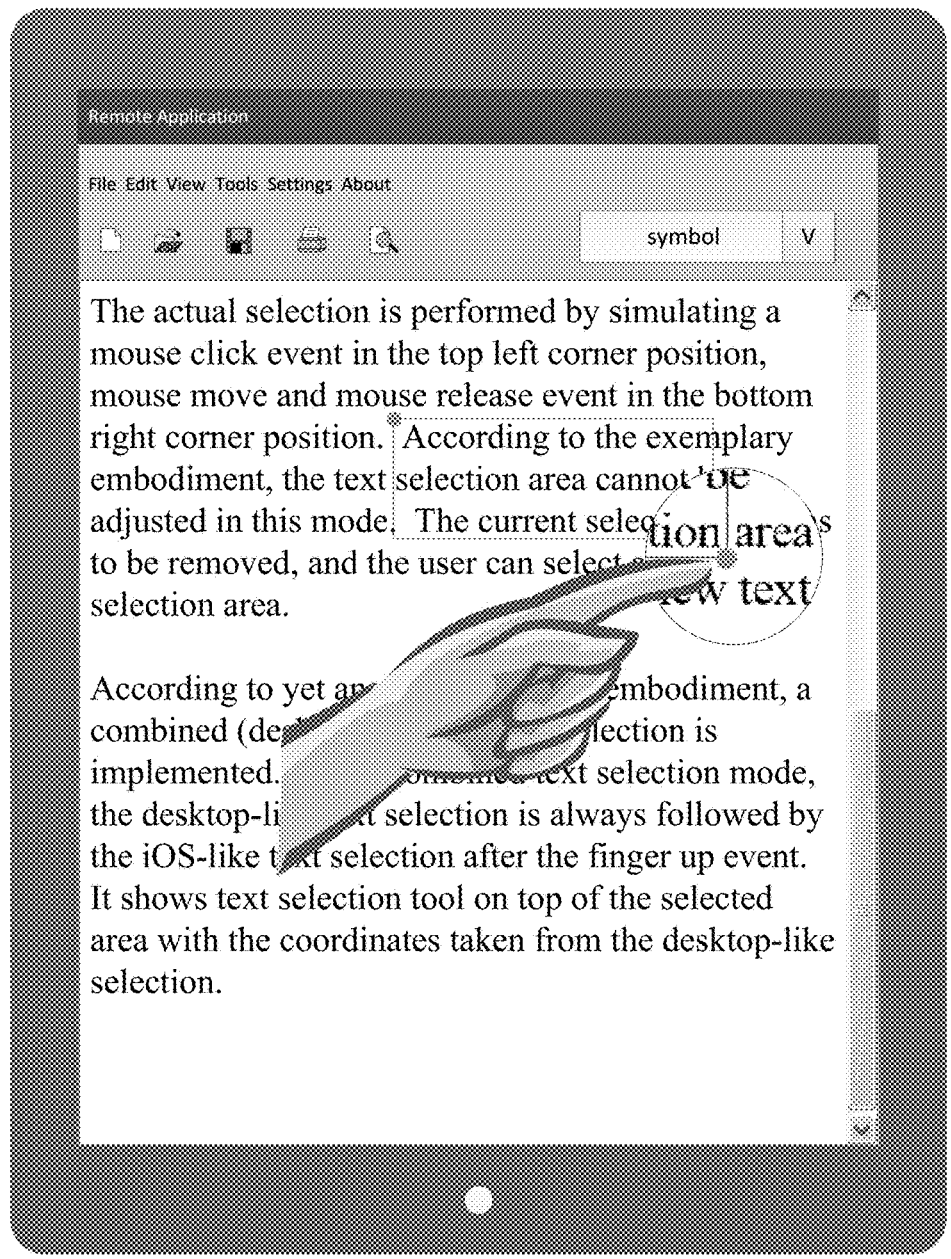
Figure 7:
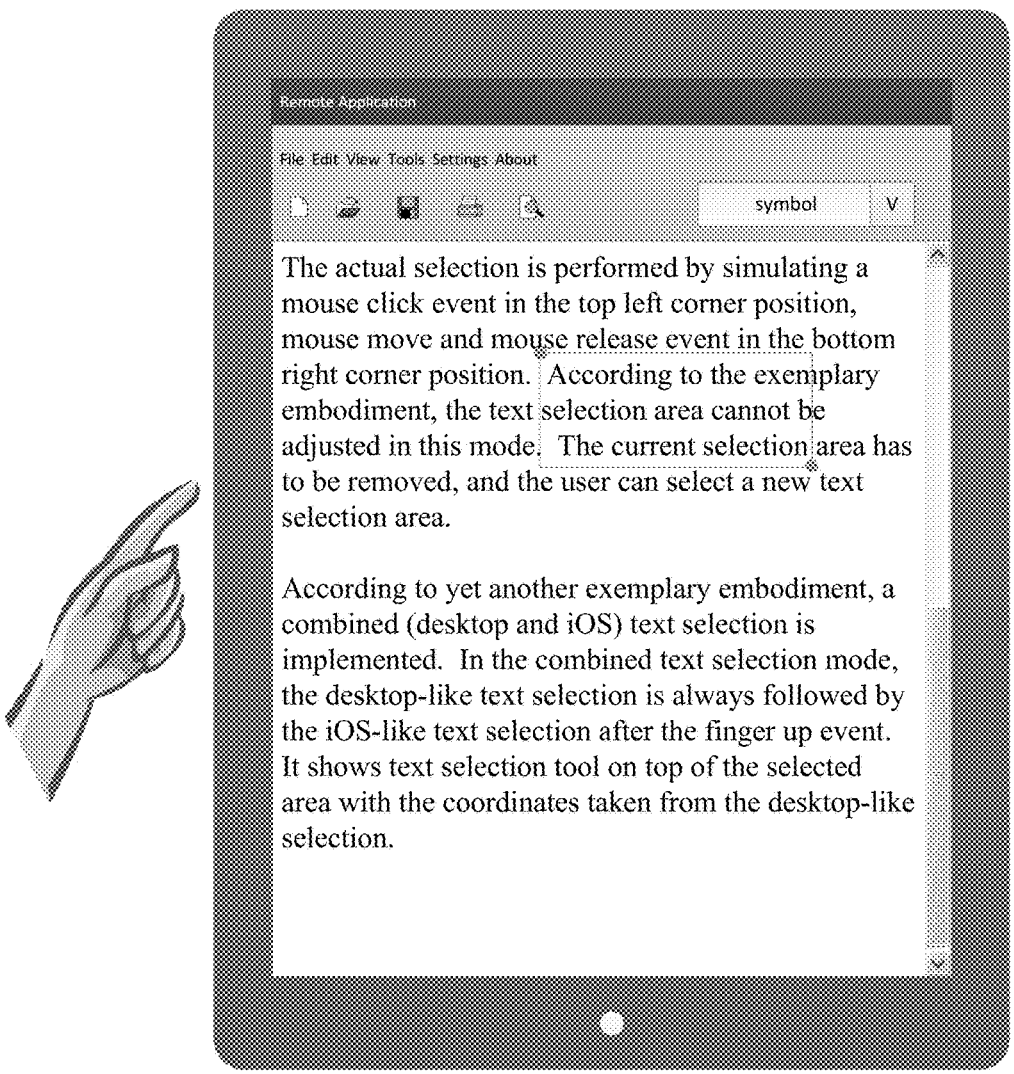
Figure 8:
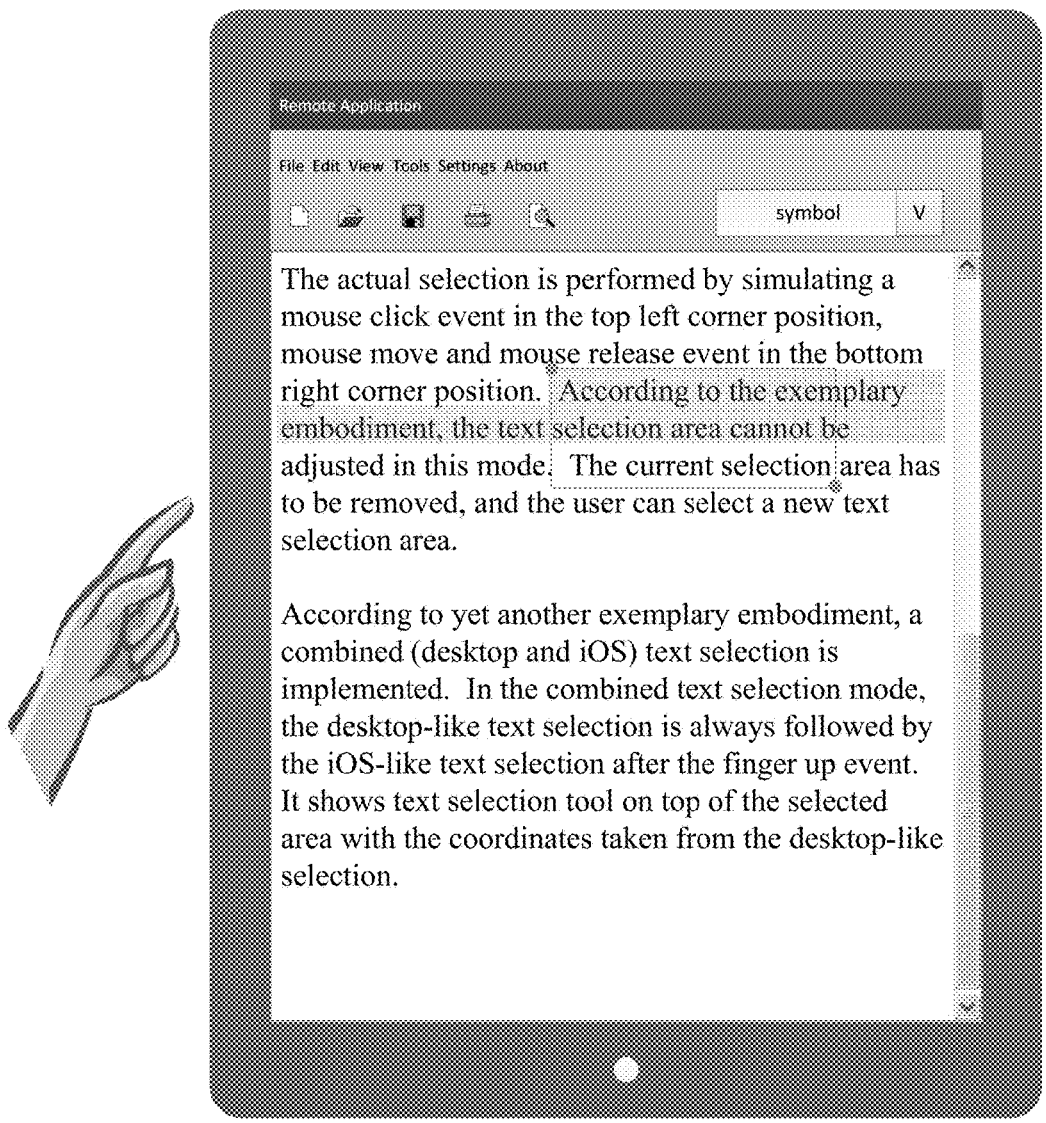
Figure 9:
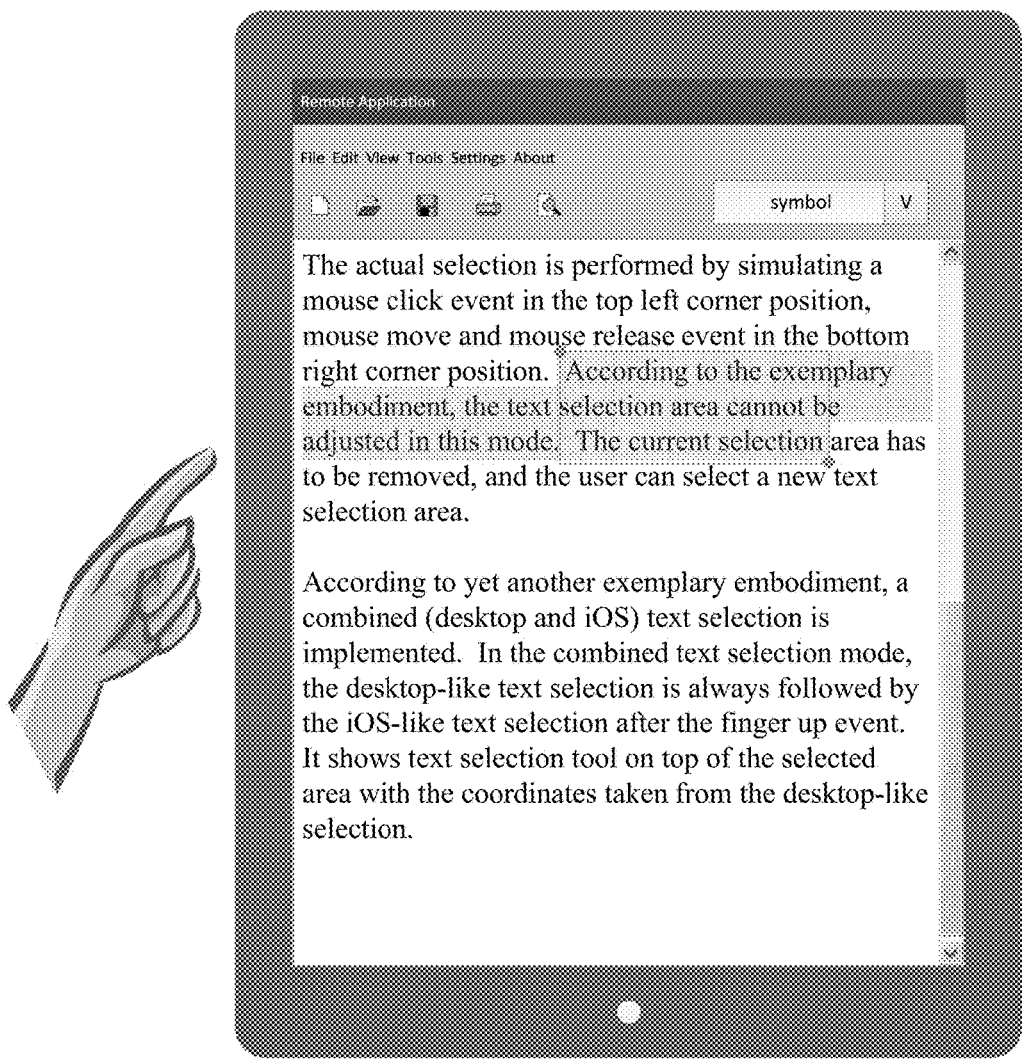
Figure 10:
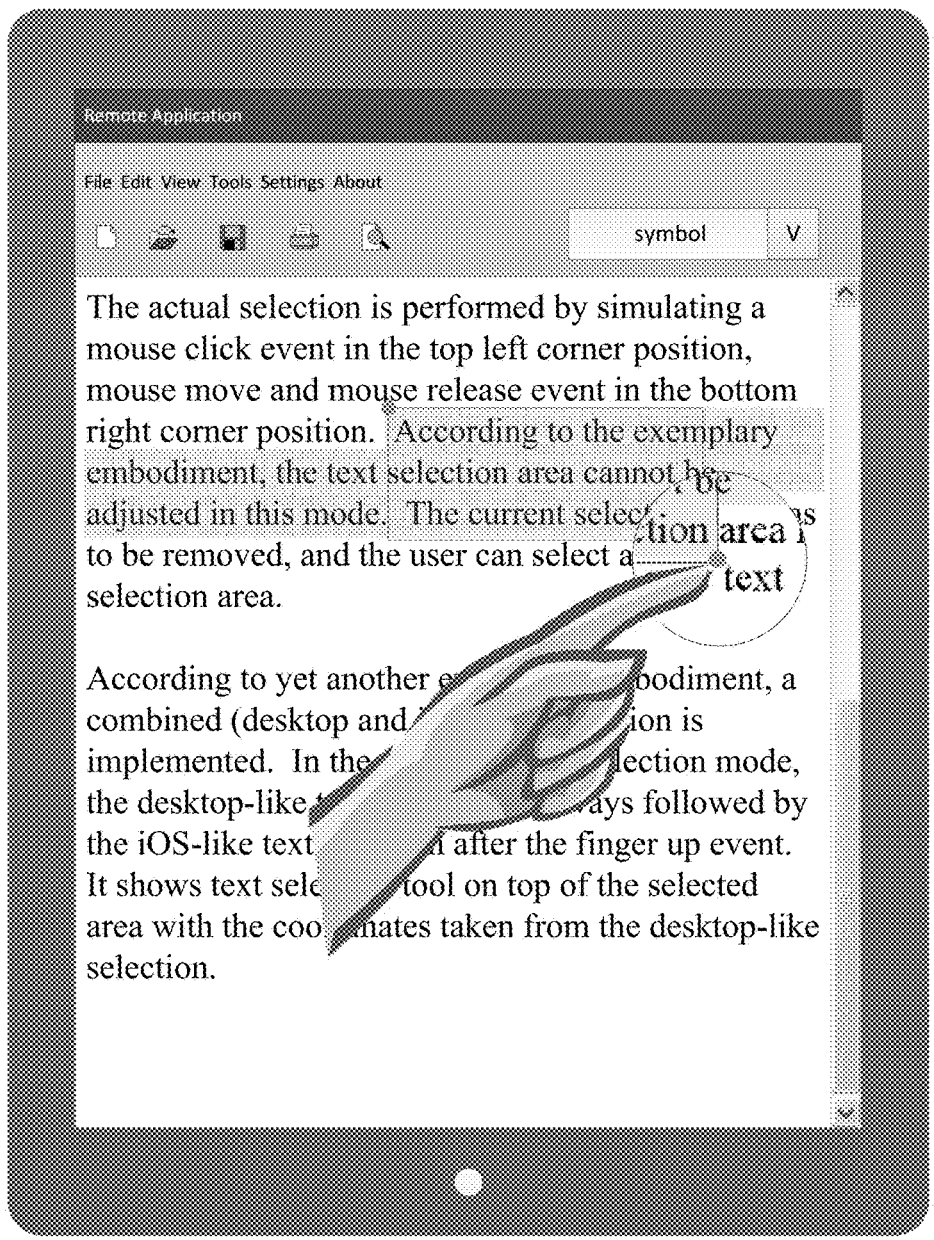
Figure 11:
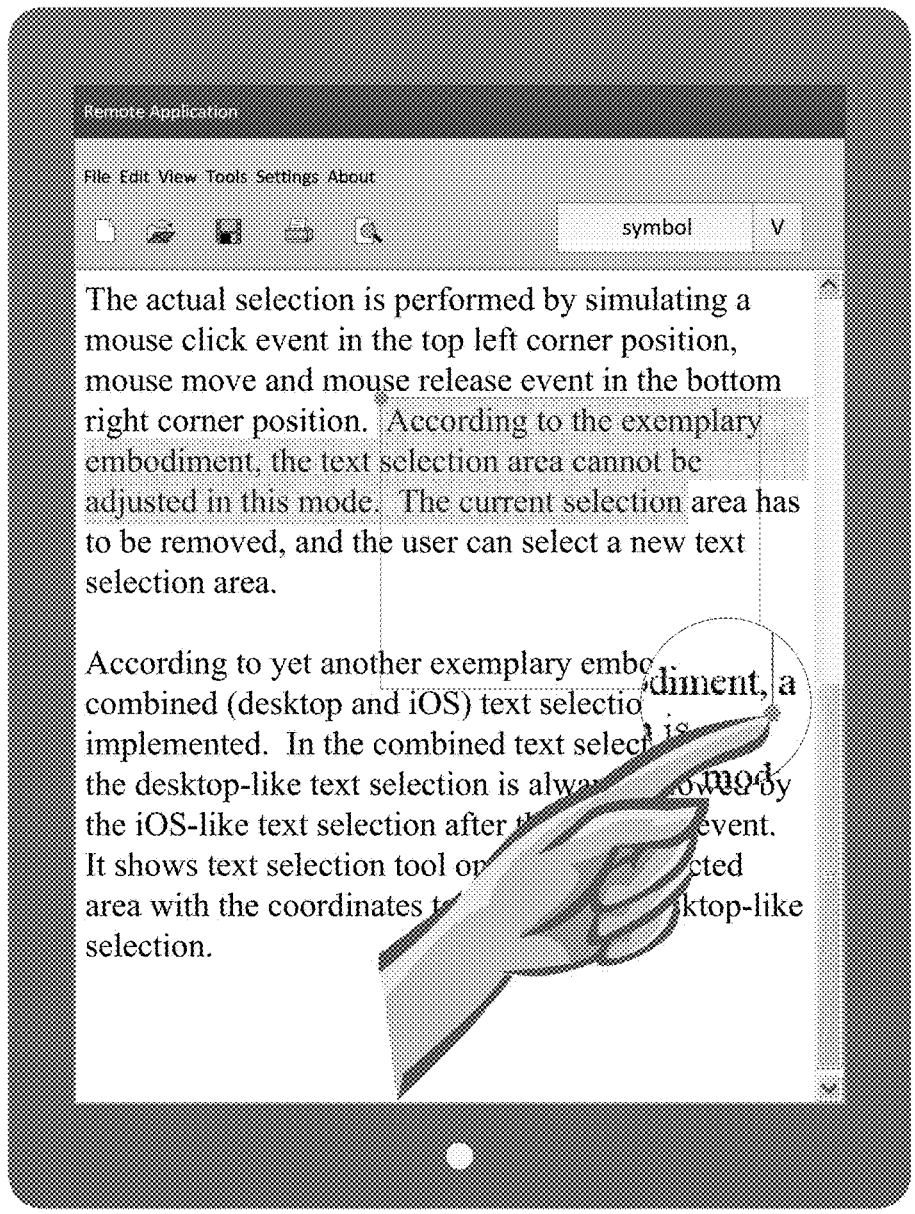
Figure 12:
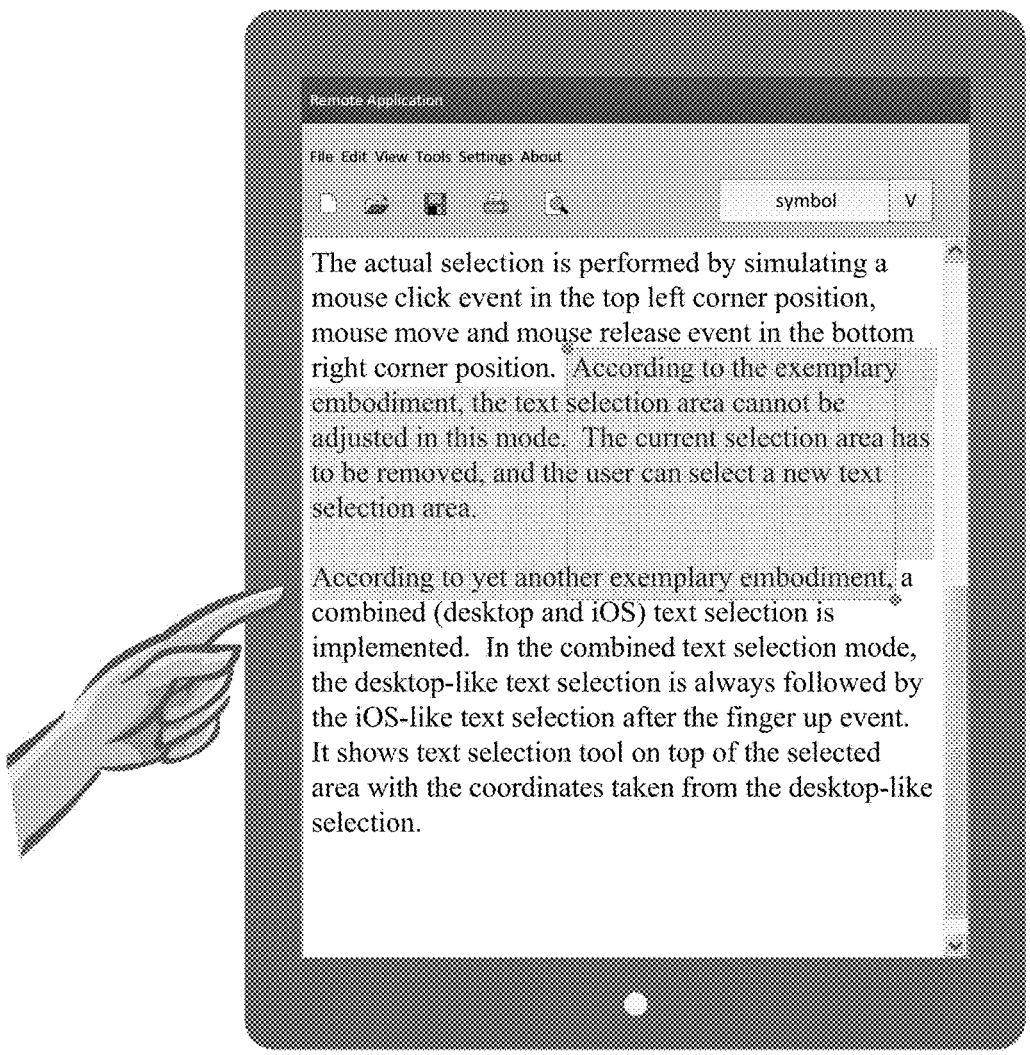
Figure 13:
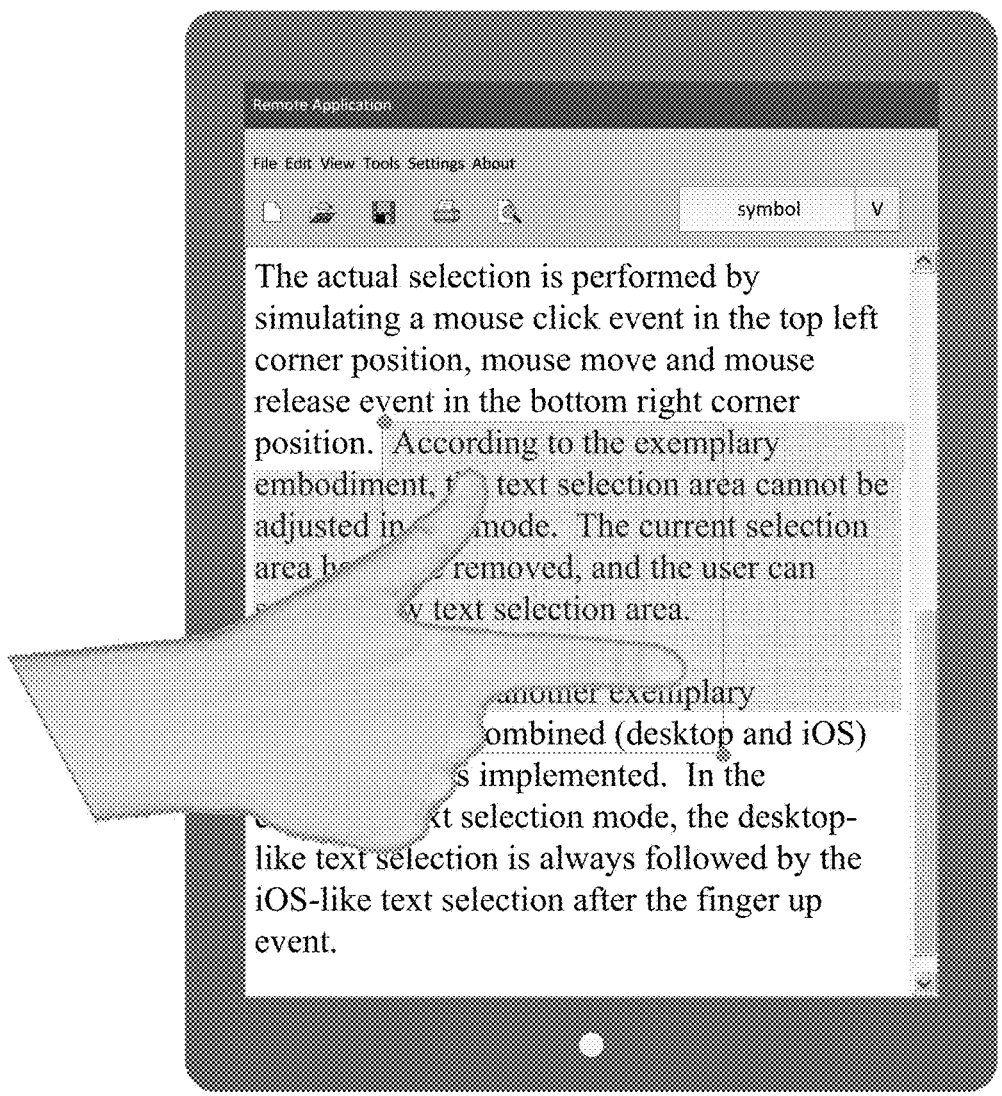
Figure 14:
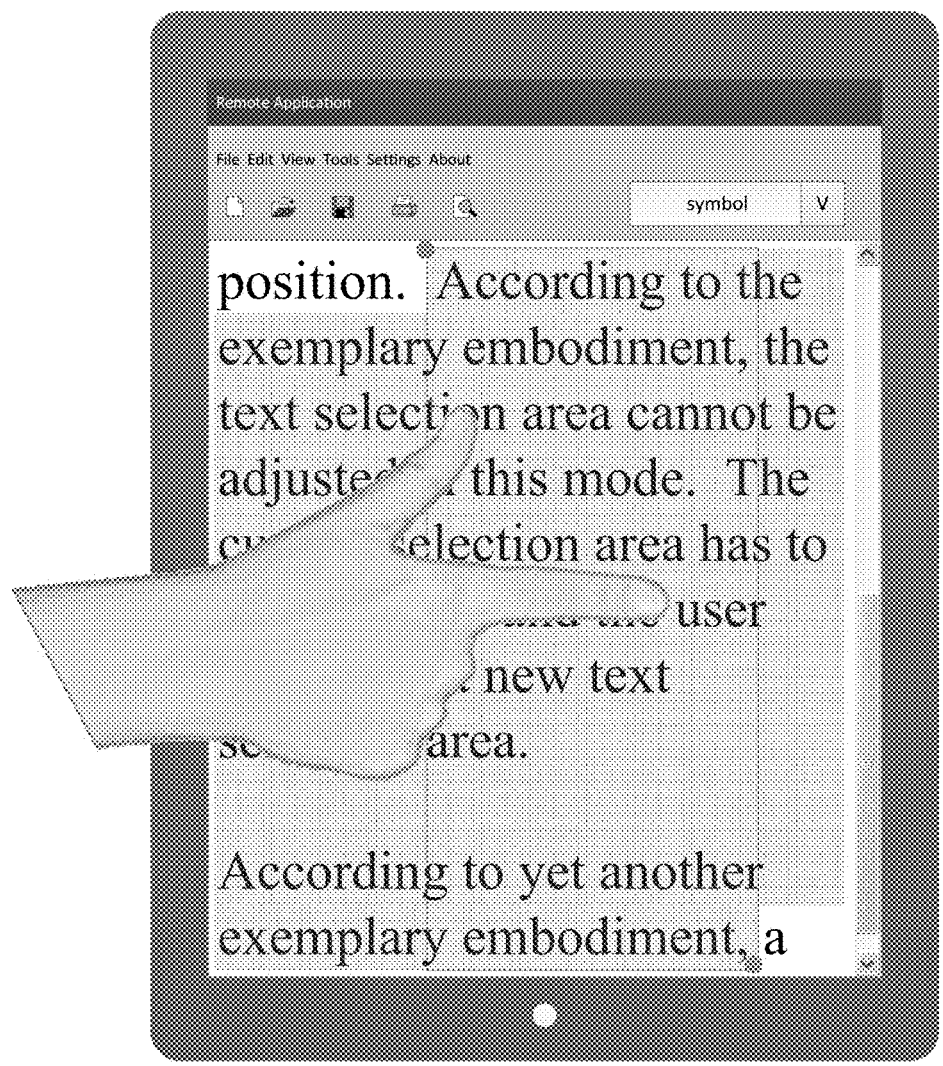
Figure 15:
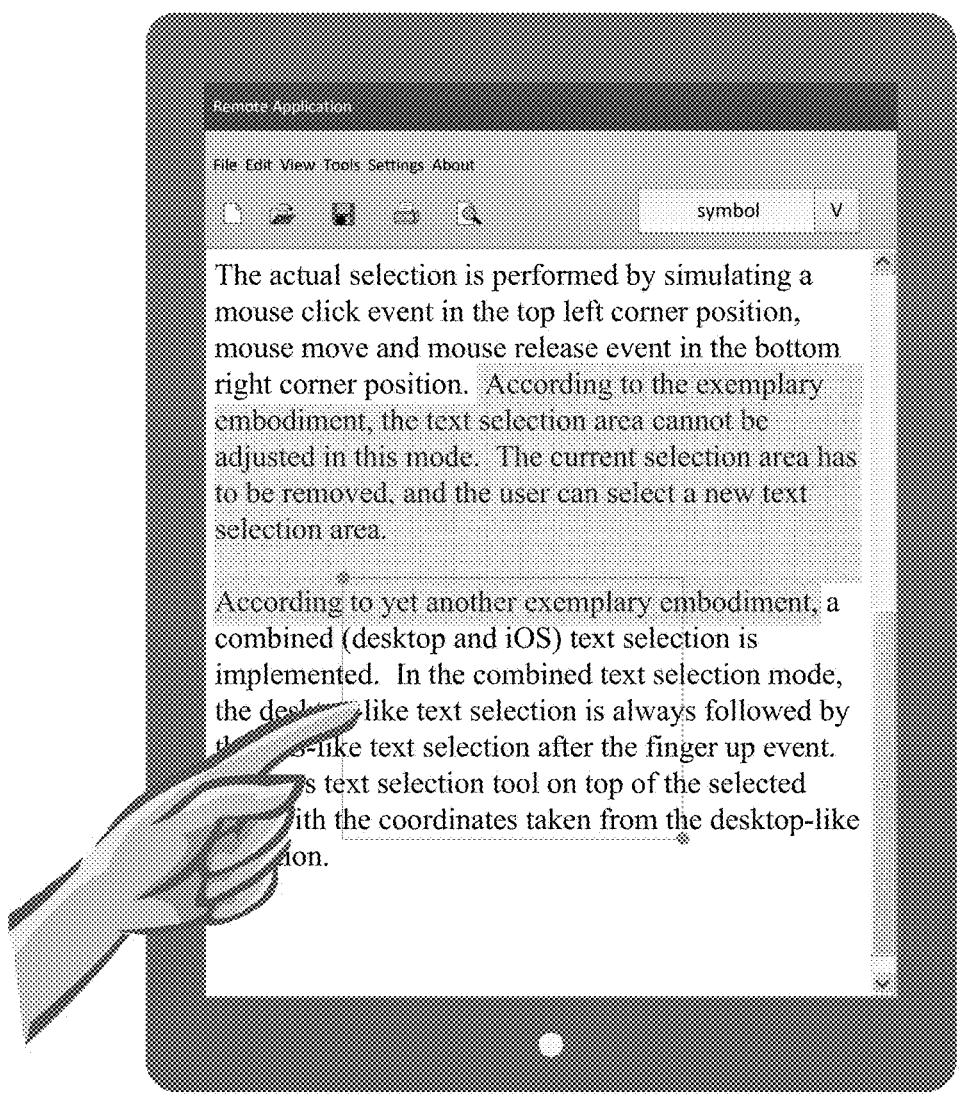
Figure 16:
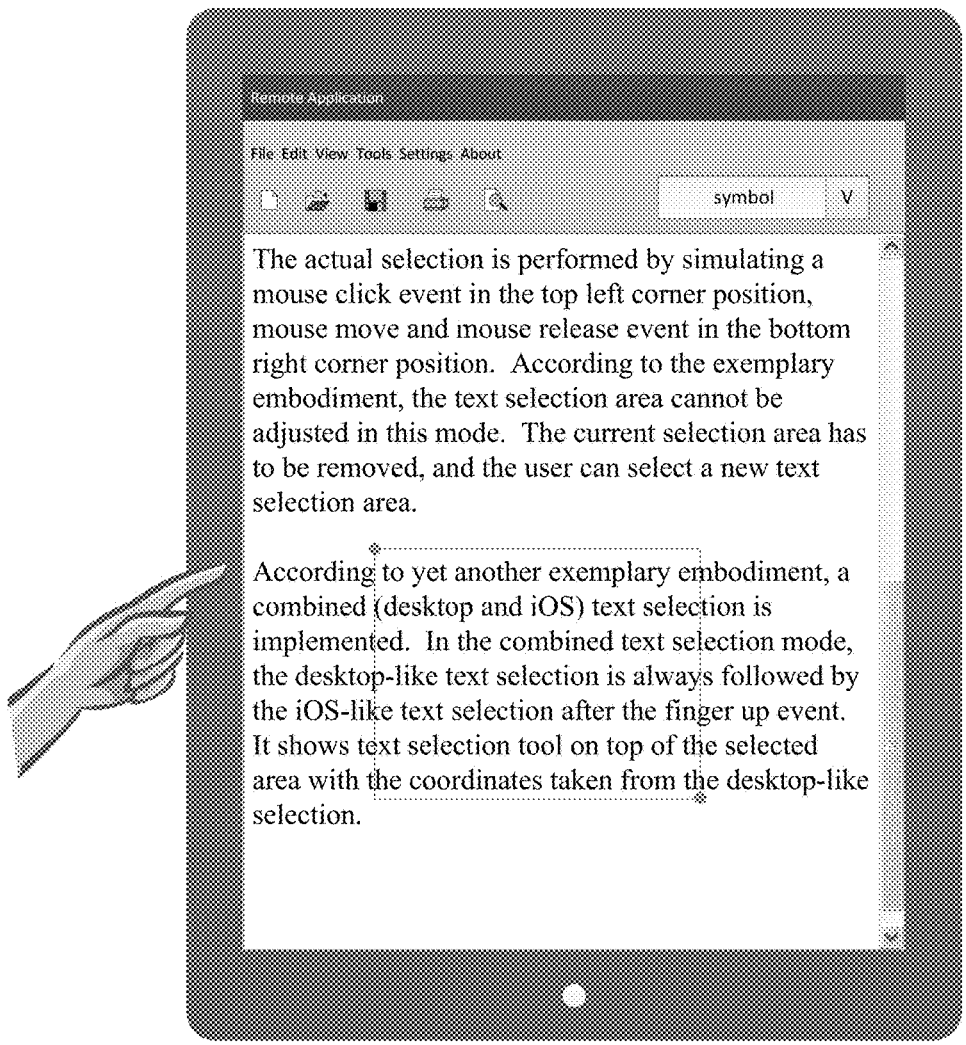
Figure 17:
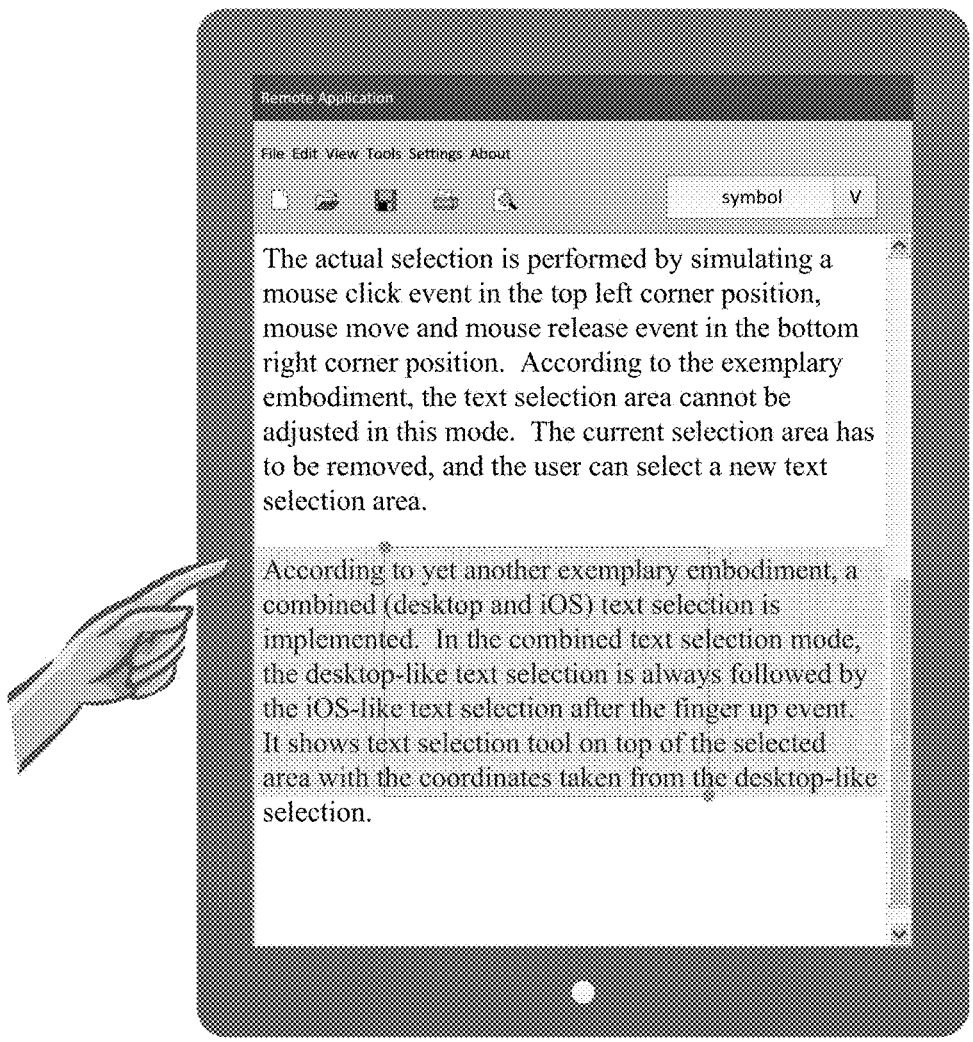

FIGS. 5-17 show screenshot-type assemblies illustrating the method as described herein. FIG. 5 shows the magnifier starting. FIG. 6 shows the initial selection completed by the user. FIG. 7 shows the initial selection rendered on the tablet, and the control command is sent to the server. FIG. 8 shows the server returning the visualized selection. FIG. 9 shows the device after selection has been changed. FIG. 10 shows the magnifier pop up while changing selection. FIG. 11 shows the process of changing the selection using the magnifier. FIG. 12 shows selection changing completed. FIG. 13 shows simultaneous magnification of desktop and selected area. FIG. 14 shows what happens during the process of magnification. FIG. 15 shows that the selection movement is finished. FIG. 16 shows that the selection is rejected on the server. FIG. 17 shows how new selection parameters are applied on the server.

As will be appreciated, the text selection process may start once the user has finished defining an area on the touchscreen device (i.e., has released his finger from the touchscreen), or the process may be dynamic, i.e., as the user is in the process of defining the area and his finger is still moving along the touchscreen surface.

Figure 4:
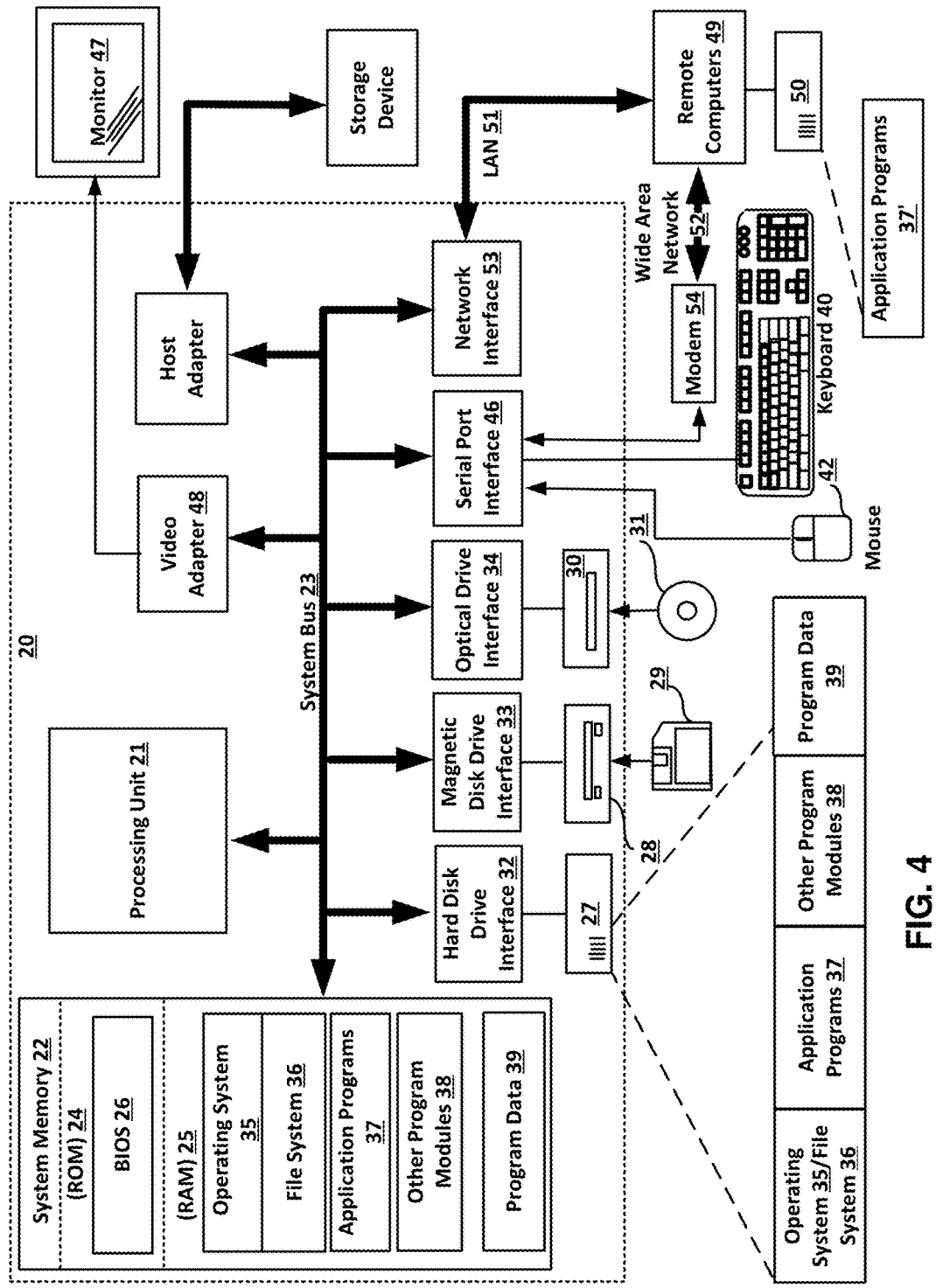
FIG. 4 illustrates a schematic diagram of an exemplary computer or server that can be used in the invention.

With reference to FIG. 4, an exemplary system for implementing the invention includes a general purpose computing device in the form of a host computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the host computer 20, such as during start-up, is stored in ROM 24. The host computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the host computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The host computer 20 includes a file system 36 associated with or included within the operating system 35, such as the WINDOWS NT™ File System (NTFS), one or more application programs 37, other program modules 38 and program data 39. A user may enter commands and information into the personal computer 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device 57, such as a hard disk drive, a magnetic tape, or other type of storage device is also connected to the system bus 23 via an interface, such as a host adapter 55 via a connection interface 56, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the host computer 20, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the method and system for emulation of the host external devices not supported by the VM Guest OS.

It should also be appreciated that various modifications, adaptations, and alternative embodiments thereof may be made within the scope and spirit of the present invention. The invention is further defined by the following claims.

What is claimed is:

1. A computer-implemented method for selecting a text on remote server, the method comprising:
    connecting a touchscreen device to a server;
    making an initial selection of a text region on the touchscreen device using touchscreen-specific commands;
    translating the selection into server control commands that correspond to a desktop application;
    transferring the control commands to the server;
    applying the selection on the server upon receiving a latest screen image;
    generating image frames for the touchscreen device by:
        setting all pixels of the image frame to 1 if a distance to an OS default selection color in the HSV color space is below a threshold;
        cleaning up the image frame to remove isolated groups of one and two 1s surrounded by 0s;
        removing all isolated groups of pixels that do not intersect with the selected text region; and
        converting a prepared image frame into at least one rectangle that fits the selected text region;

transmitting the image frames containing the rectangle to the touchscreen device; and changing the selection on the touchscreen device.

2. The method of claim 1, wherein the touchscreen device is a tablet.

3. The method of claim 1, wherein the initial selection of the text includes determining if a system highlight hue is used.

4. The method of claim 1, wherein the text is identified on a server, and a set of highlighted text areas are transmitted to the touchscreen device for display.

5. The method of claim 1, wherein icons associated with the text blocks are selected.

6. The method of claim 1, wherein the initial selection is defined on a screen of the touchscreen device as a plurality of polygons overlapping the text.

7. The method of claim 1, wherein the text is identified on the server, and text parameters are transmitted to the touchscreen device.

8. The method of claim 1, wherein a user can zoom in the text during the selecting by using a virtual magnifying glass.

9. The method of claim 1, wherein multiple areas are selected, with the text in different locations that are separated from each other.

10. A computer-implemented method for controlling a data selection from a remote server, the method comprising:

connecting a touchscreen device to the server;

generating image frames, the image frames representing the data on the server for the touchscreen device;

continuously transmitting the image frames to the touchscreen device;

making an initial selection of a region using touchscreen-specific commands;

placing an image of the selection region over representations of the image frames on the touchscreen device;

accepting the selection using a touchscreen device interface;

translating selection parameters into server control commands that correspond to a desktop application, the selection parameters describing the data selection covered by the selection region on the touchscreen device;

transferring the control commands to the server;

marking the data of the selection region on the server by:

setting all pixels of the image frame to 1 if a distance to an OS default selection color in the HSV color space is below a threshold;

cleaning up the image frame to remove isolated groups of one and two 1s surrounded by 0s;

removing all isolated groups of pixels that do not intersect with the selected region; and converting a prepared image frame into at least one rectangle that fits the selected region;

generating an additional control command on the touchscreen device;

transmitting the additional control command to the server; and processing the selected data based on the additional control command;

wherein the additional control command relates to copy-to-clipboard, delete, or moving the data.

* * * * *